(12) United States Patent
Sakata et al.

(10) Patent No.: US 8,404,763 B2
(45) Date of Patent: *Mar. 26, 2013

(54) METHOD FOR FORMING AN INSERT INJECTION-MOLDED ARTICLE EXHIBITING IMPROVED RESISTANCE TO HEAT SHOCK COMPRISING A SPECIFICALLY DEFINED POLYBUTYLENE TEREPHTHALATE COMPOSITION

(75) Inventors: Kouichi Sakata, Shizuoka (JP); Fumiyuki Ohtake, Shizuoka (JP)

(73) Assignee: Wintech Polymer Ltd., Minato-Ku, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/996,490

(22) PCT Filed: Jun. 10, 2009

(86) PCT No.: PCT/JP2009/002610
§ 371 (c)(1),
(2), (4) Date: Dec. 6, 2010

(87) PCT Pub. No.: WO2009/150833
PCT Pub. Date: Dec. 17, 2009

(65) Prior Publication Data
US 2011/0092616 A1    Apr. 21, 2011

(30) Foreign Application Priority Data
Jun. 11, 2008 (JP) ................................. 2008-153151

(51) Int. Cl.
*C08K 5/29* (2006.01)
*B29C 45/00* (2006.01)
(52) U.S. Cl. .................... 523/506; 524/195; 264/328.18
(58) Field of Classification Search .................. 524/195; 523/506; 264/328.18
See application file for complete search history.

(56) References Cited

U.S. PATENT DOCUMENTS

| 4,859,741 A | 8/1989 | Takahashi et al. |
| 6,512,027 B2 | 1/2003 | Kanai et al. |

FOREIGN PATENT DOCUMENTS

| GB | 1 386 548 A | 3/1975 |
| GB | 1587894 | 4/1981 |
| JP | 53-121843 A | 10/1978 |
| JP | 60-210659 A | 10/1985 |
| JP | 4-169214 A | 6/1992 |
| JP | 6-009861 A | 1/1994 |
| JP | 49-54456 A | 5/1994 |
| JP | 8-041302 A | 2/1996 |
| JP | 8-311312 A | 11/1996 |
| JP | 9-124908 A | 5/1997 |
| JP | 2007-112858 A | 5/2007 |
| JP | 2007169367 A | 7/2007 |

OTHER PUBLICATIONS

Machine translation of JP 2007-112858. May 2007.*
Machine translation of JP 09-124908. May 1997.*
Machine translation of JP 06-009861. Jan. 1994.*
International Search Report (PCT/ISA/210) issued on Sep. 8, 2009, by Japanese Patent Office as the International Searching Authority for International Application No. PCT/JP2009/002610.

* cited by examiner

*Primary Examiner* — John Uselding
(74) *Attorney, Agent, or Firm* — Buchanan Ingersoll & Rooney

(57) ABSTRACT

The present invention provides a polybutylene terephthalate resin composition having both low warpage and high durability in a cold cycle environment. Specifically, relative to 100 parts by weight of a polybutylene terephthalate resin (A) having 30 meq/kg or less of the amount of terminal carboxyl groups, there are added a carbodiimide compound (B) in an amount of 0.3 to 2 equivalents of the carbodiimide functional group when the amount of carboxyl terminal group in the polybutylene terephthalate resin (A) is set as 1, 20 to 100 parts by weight of a fibrous filler (C), and 15 to 65 parts by weight of a thermoplastic resin (D) of one or more selected from polycarbonate resin and polyethylene terephthalate resin.

15 Claims, No Drawings

METHOD FOR FORMING AN INSERT INJECTION-MOLDED ARTICLE EXHIBITING IMPROVED RESISTANCE TO HEAT SHOCK COMPRISING A SPECIFICALLY DEFINED POLYBUTYLENE TEREPHTHALATE COMPOSITION

TECHNICAL FIELD

The present invention relates to a polybutylene terephthalate resin composition and a molded article thereof which are excellent in low warpage and resistance to heat shock.

BACKGROUND ART

Polybutylene terephthalate resins are used as engineering plastics in wide fields including automobile parts, electric and electronic parts, or the like owing to their excellent mechanical properties, electric properties, and other physical and chemical properties, and their good workability. In particular, since their heat resistance and strength can be increased by adding a fibrous filler such as glass fiber thereto, polybutylene terephthalate resins are often used by reinforcing thereof by the fibrous filler.

Particularly in the field of automobiles, polybutylene terephthalate is often used as a material of sensors used for electrical control and housings of ECU. Since such a product requires low warpage, it is often alloyed with a noncrystalline resin, such as polycarbonate, or added with an inorganic filler of a high aspect ratio in flakes or powder.

On the other hand, for the parts (insert molded articles) being mounted in an environment of severe temperature increase/decrease, such as engine room of automobile, the toughness of the parts is often improved by adopting an elastomer and the like to prevent crack generation caused by strain resulting from the difference in linear expansion between metal and resin. However, a large amount of an elastomer is required to be blended to achieve sufficient resistance to heat shock and there has been a problem of reduction in the strength. In particular, as described above, the resistance to heat shock is prone to be reduced in a system where alloyed with a noncrystalline resin, such as polycarbonate, or added with an inorganic filler of a high aspect ratio in flakes or powder to achieve the low warpage, and it has been difficult to have both the resistance to heat shock and the low warpage.

Although JP-A 53-121843 discloses that low warpage are improved by combining a fibrous filler with a plate filler, this material is low in resistance to heat shock.

In addition, although JP-A 4-169214 describes that the adhesion with an inserted metal is improved by blending polycarbonate and a fibrous and/or nonfibrous filler in polybutylene terephthalate, there is no description regarding the resistance to heat shock, and in reality, in such a composition, the resistance to heat shock is insufficient.

Further, although JP-A 8-311312 describes that the morphological stability and the flexural toughness at low temperatures are improved by blending polycarbonate and a core shell polymer in polybutylene terephthalate, there is no description regarding the resistance to heat shock, and in reality, in such a composition, the resistance to heat shock is insufficient.

DISCLOSURE OF THE INVENTION

The present invention has been made to solve the above technical problems, and an object of the present invention is to provide a polybutylene terephthalate resin composition, which has both low warpage and high durability in a cold cycle environment, and to provide a molded article thereof.

The inventors of the present invention have conducted detail studies to obtain a polybutylene terephthalate resin composition capable of achieving the above object, and have found that a composition which is made up mainly of a polybutylene terephthalate resin having 30 meq/kg or less of terminal carboxyl groups and to which a specific amount of a carbodiimide compound, a fibrous filler and a polycarbonate resin, and/or a polyethylene terephthalate resin are added in combination imparts an extremely high resistance to heat shock and low warpage without significant deterioration in the mechanical properties, thus having completed the present invention.

That is, the present invention provides a polybutylene terephthalate resin composition, obtained by blending 100 parts by weight of a polybutylene terephthalate resin (A) having 30 meq/kg or less of terminal carboxyl groups with a carbodiimide compound (B) in an amount of 0.3 to 2 equivalents of the carbodiimide functional group when the amount of terminal carboxyl groups in the polybutylene terephthalate resin (A) is set as 1; 20 to 100 parts by weight of a fibrous filler (C); and 15 to 65 parts by weight of a thermoplastic resin (D) of one or more selected from polycarbonate resin and polyethylene terephthalate resin, and provides a molded article made by molding the resin composition, specifically an insert-molded article thereof.

The present invention also provides a polybutylene terephthalate resin composition including: 100 parts by weight of a polybutylene terephthalate resin (A) having 30 meq/kg or less of terminal carboxyl groups; a carbodiimide compound (B) in an amount of 0.3 to 2 equivalents of the carbodiimide functional group when the amount of terminal carboxyl groups in the polybutylene terephthalate resin (A) is set as 1; 20 to 100 parts by weight of a fibrous filler (C); and 15 to 65 parts by weight of a thermoplastic resin (D) of one or more selected from polycarbonate resin and polyethylene terephthalate resin.

The present invention also provides an insert injection molded article including the above polybutylene terephthalate resin composition as a resin material.

The present invention further provides a method of manufacturing the above polybutylene terephthalate resin composition, including blending: 100 parts by weight of a polybutylene terephthalate resin (A) having 30 meq/kg or less of terminal carboxyl groups; a carbodiimide compound (B) in an amount of 0.3 to 2 equivalents of the carbodiimide functional group when the amount of terminal carboxyl groups in the polybutylene terephthalate resin (A) is set as 1; 20 to 100 parts by weight of a fibrous filler (C); and 15 to 65 parts by weight of a thermoplastic resin (D) of one or more selected from polycarbonate resin and polyethylene terephthalate resin.

The present invention further provides a method of manufacturing a molded article or an insert-molded article, including performing injection-molding of the above polybutylene terephthalate resin composition.

The present invention provides a polybutylene terephthalate resin composition having excellent performance of high durability and the like in a cold cycle environment and having excellent low warpage. The polybutylene terephthalate resin composition of the present invention is useful as various molded articles, in particular insert-molded articles.

DETAILED DESCRIPTION OF THE INVENTION

The structural components of the resin material of the present invention will be described in detail in the following.

The (A) polybutylene terephthalate resin which is the basic resin of the resin composition of the present invention is a polybutylene terephthalate-based resin which is obtained by polycondensation of a dicarboxylic acid component containing at least terephthalic acid or an ester-forming derivative thereof (such as lower alcohol ester) and a glycol component containing at least a C4 alkylene glycol(1,4-butane diol) or an ester-forming derivative thereof. The polybutylene terephthalate resin is not limited to the homo-polybutylene terephthalate resin, and may be a copolymer containing 60% by mole or more, specifically about 75 to 95% by mole, of butylene terephthalate unit.

The polybutylene terephthalate resin in the present invention is produced by dissolving a crushed polybutylene terephthalate sample in benzyl alcohol for 10 minutes at 215° C., followed by titrating the solution by using an aqueous solution of 0.01N sodium hydroxide to thereby be used as the polybutylene terephthalate resin having 30 meq/kg or less of the amount of terminal carboxyl groups measured, preferably 25 meq/kg or less thereof.

The use of a polybutylene terephthalate resin having more than 30 meq/kg of the amount of terminal carboxyl groups deteriorates the effect of improving the resistance to heat shock even by controlling the amount to be added of carbodiimide compound, and increases the lowering of the strength by hydrolysis in a moist-heat environment.

The lower limit of the amount of terminal carboxyl groups is not specifically limited. However, the polybutylene terephthalate resin having less than 5 meq/kg of the amount of terminal carboxyl groups is generally difficult to be produced, and the resin having less than 5 meq/kg thereof does not allow the reaction with carbodiimide compound to proceed sufficiently, which may result in insufficient effect of improving the resistance to heat shock. Accordingly, the amount of terminal carboxyl groups in the polybutylene terephthalate resin is preferably 5 meq/kg or more, and specifically preferably 10 meq/kg or more.

Furthermore, the intrinsic viscosity (IV) of the applied (A) polybutylene terephthalic resin is preferably within the range of 0.67 to 0.90 dL/g. If the intrinsic viscosity exceeds 0.90 dL/g, the flowability at the time of molding necessary for the insert-molding article cannot be attained in some cases. The intrinsic viscosity of 0.90 dL/g or less can also be attained by blending polybutylene terephthalate resins having different intrinsic viscosities from each other, for example, the one having an intrinsic viscosity of 1.00 dL/g and the one having an intrinsic viscosity of 0.70 dL/g. The intrinsic viscosity can be determined, for example, in o-chlorophenol at 35° C.

In the polybutylene terephthalate resin, examples of the dicarboxylic acid component (comonomer component) other than terephthalic acid and an ester-forming derivative thereof are: an aromatic dicarboxylic acid component (such as $C_6$-$C_{12}$ aryldicarboxylic acid including isophthalic acid, phthalic acid, naphthalene dicarboxylic acid or diphenylether dicarboxylic acid); an aliphatic dicarboxylic acid component (such as $C_4$-$C_{16}$ alkyldicarboxylic acid including succinic acid, adipic acid, azelaic acid, and sebacic acid, or $C_5$-$C_{10}$ cycloalkyl dicarboxylic acid including cyclohexane dicarboxylic acid); and an ester-forming derivative thereof. Those dicarboxylic acid components can be used alone or in combination of two or more thereof.

Preferable dicarboxylic acid component (comonomer component) includes an aromatic dicarboxylic acid component (specifically $C_6$-$C_{10}$ aryl dicarboxylic acid such as isophthalic acid) and an aliphatic dicarboxylic acid component (specifically $C_6$-$C_{12}$ alkyl dicarboxylic acid such as adipic acid, azelaic acid or sebacic acid).

Examples of glycol component (comonomer component) other than 1,4-butane diol are: an aliphatic diol component (such as alkylene glycol (including $C_2$-$C_{10}$ alkylene glycol such as ethylene glycol, propylene glycol, trimethylene glycol, 1,3-butylene glycol, hexamethylene glycol, neopenthyl glycol or 1,3-octane diol, and polyoxy $C_2$-$C_4$ alkylene glycol such as diethylene glycol, triethylene glycol or dipropylene glycol), and alicyclic diol such as cyclohexane dimethanol or hydrogenated bisphenol A); an aromatic diol component (such as aromatic alcohol including bisphenol A and 4,4-dihydroxybiphenyl, or $C_2$-$C_4$ alkyleneoxide adduct of bisphenol A (for example, 2-mole adduct of ethylene oxide of bisphenol A and 3-mole adduct of propylene oxide of bisphenol A)); and an ester-forming derivative thereof. These glycol components can also be used alone or in combination of two or more thereof.

Preferred glycol component (Comonomer component) includes an aliphatic diol component (specifically $C_2$-$C_6$ alkylene glycol, polyoxy $C_2$-$C_3$ alkylene glycol such as diethylene glycol, and alicyclic diol such as cyclohexane dimethanol).

Any of the polybutylene terephthalate-based polymers obtained by polycondensation of above compounds as the monomer components can be used as the (A) component of the present invention. The combined use of homo-polybutylene terephthalate polymer and polybutylene terephthalate copolymer is also useful.

The (B) carbodiimide compound used in the present invention is a compound having carbodiimide group (—N=C=N—) in the molecule. Applicable carbodiimide compound includes an aliphatic carbodiimide compound having the aliphatic main chain, an alicyclic carbodiimide compound having the alicyclic main chain, and an aromatic carbodiimide compound having the aromatic main chain, and a preferred one is an aromatic carbodiimide compound in terms of resistance to hydrolysis.

Examples of the aliphatic carbodiimide compound include diisopropyl carbodiimide, dioctyldecyl carbodiimide, or the like. An example of the alicyclic carbodiimide compound includes dicyclohexyl carbodiimide, or the like.

Examples of aromatic carbodiimide compound include: a mono- or di-carbodiimide compound such as diphenyl carbodiimide, di-2,6-dimethylphenyl carbodiimide, N-tolyl-N'-phenyl carbodiimide, di-p-nitrophenyl carbodiimide, di-p-aminophenyl carbodiimide, di-p-hydroxyphenyl carbodiimide, di-p-chlorophenyl carbodiimide, di-p-methoxyphenyl carbodiimide, di-3,4-dichlorophenyl carbodiimide, di-2,5-dichlorophenyl carbodiimide, di-o-chlorophenyl carbodiimide, p-phenylene-bis-di-o-tolyl carbodiimide, p-phenylene-bis-dicyclohexyl carbodiimide, p-phenylene-bis-di-p-chlorophenyl carbodiimide or ethylene-bis-diphenyl carbodiimide; and a polycarbodiimide compound such as poly(4,4'-diphenylmethane carbodiimide), poly(3,5'-dimethyl-4,4'-biphenylmethane carbodiimide), poly(p-phenylene carbodiimide), poly(m-phenylene carbodiimide), poly(3,5'-dimethyl-4,4'-diphenylmethane carbodiimide), poly(naphthylene carbodiimide), poly(1,3-diisopropylphenylene carbodiimide), poly(1-methyl-3,5-diisopropylphenylene carbodiimide), poly(1,3,5-triethylphenylene carbodiimide) or poly(triisopropylphenylene carbodiimide). These compounds can be used in combination of two or more of them. Among these, specifically preferred ones to be used are di-2,6-dimethylphenyl carbodiimide, poly(4,4'-diphenylmethane carbodiimide), poly(phenylene carbodiimide), and poly(triisopropylphenylene carbodiimide).

A preferred (B) carbodiimide compound to be used is the one having 2000 or larger molecular weight. The one having a molecular weight of less than 2000 may generate gas and odor when the retention time is long during melt-kneading and during molding.

The blending amount of (B) carbodiimide compound corresponds to the amount of carbodiimide functional group within the range of 0.3 to 2.0 equivalents when the amount of the terminal carboxyl groups in the (A) polybutylene terephthalate resin is set as 1.

If the amount of (B) component is excessively small, the effect of improving the resistance to heat shock, which is an object of the present invention, cannot be attained. If the amount thereof is excessively large, there likely appears the lowering of flowability and the generation of gel component and carbide at the time of compounding and molding processing, and appear the deterioration of mechanical characteristics such as tensile strength and flexural strength, and the rapid decrease in strength in a moist heat environment. This is because of the deterioration of adhesion between the polybutylene terephthalate resin and the glass filler caused by the (B) component. A preferred blending amount of the (B) component corresponds to the amount of carbodiimide functional group within the range of 0.5 to 2.0 equivalents, and more preferably 0.8 to 1.5 equivalents.

Examples of the (C) fibrous filler used in the present invention include glass fiber, carbon finer, potassium titanate fiber, silica-alumina fiber, zirconia fiber, metal fiber, organic fiber, or the like. Among these, glass fiber is preferred.

For the glass fiber, any of known glass fibers is preferably used irrespective of the fiber diameter, the shape such as cylinder, cocoon, or elliptical cross section of the glass fiber, and the length of and the cutting method in manufacturing chopped strand, roving, or the like. Although the present invention is independent of the kind of glass, preferred ones are E-glass and corrosion-resistant glass containing zirconium element in the composition in view of the quality.

According to the present invention, in order to improve the characteristic of interface between the fibrous filler and the resin matrix, a fibrous filler surface-treated by using an organic treatment agent such as amino-silane compound and epoxy compound is specifically preferred, and a glass fiber containing 1% by weight or more of organic treatment agent, expressed by the loss on heating, is specifically preferred. Preferable amino-silane compound and epoxy compound used in those fibrous fillers are any of known ones, irrespective of the kind of amino-silane and epoxy compound used for the surface treatment of the fibrous filler according to the present invention.

The amount of (C) fibrous filler to be used is 20 to 100 parts by weight relative to 100 parts by weight of the (A) polybutylene terephthalate resin. If the amount of (C) fibrous filler is smaller than the above range, the variations in linear expansion accompanied with the cold cycle become large, which is not preferable in view of resistance to heat shock. If the amount of (C) fibrous filler to be used exceeds the above range, the allowable strain of the material decreases, which is unfavorable from the point of resistance to heat shock. The amount of (C) fibrous filler is preferably within the range of 20 to 80 parts by weight, and more preferably 30 to 60 parts by weight.

Meanwhile, the present invention allows the combined blending of a non-fibrous filler which has no fibrous shape as in the case of the (C) component, that is to say, an inorganic filler in plate shape or granular shape, or a mixture thereof. Such non-fibrous filler includes glass flake, glass bead, mica, talc, carbon black, calcium carbonate, or the like.

The (D) component used in the present invention includes one or more of thermoplastic resins selected from polycarbonate resins and polyethylene terephthalate resins.

The polycarbonate resin is obtained by the reaction of a dihydroxy compound with carbonate ester, such as phosgene or diphenyl carbonate. Although the dihydroxy compound may be an alicyclic compound, it is preferred to be an aromatic compound (in particular, a bisphenol compound).

Examples of the bisphenol compound include bisphenols (for example, bis(hydroxyaryl) $C_{1-6}$ alkane; bis(hydroxyaryl) $C_{4-10}$ cycloalkane; 4,4'-dihydroxydiphenyl ether; 4,4'-dihydroxydiphenyl sulfone; 4,4'-dihydroxydiphenyl sulfide; 4,4'-dihydroxydiphenyl ketone, and the like), propane, dipropoxylated bisphenol A, and the like. A preferred polycarbonate resin includes bisphenol A-type polycarbonate.

The polyethylene terephthalate resin includes homopolyester or copolyester (an ethylene terephthalate-based copolymer or modified polyethylene terephthalate resin) having ethylene terephthalate as a main component (for example, 50 to 100% by weight, preferably 60 to 100% by weight, even more preferably 75 to 100% by weight, approximately), and in particular, copolyester is excellent in low warpage.

Examples of the copolymeric monomer in the copolyester include dicarboxylic acid excluding terephthalic acid, diol excluding ethylene glycol, oxycarboxylic acid, lactone, and the like, and also it is possible to use one of the monomers listed in the section of the polybutylene terephthalate resin or in combination of two or more.

Examples of a preferred copolymeric monomer include, for example, diols (a $C_{3-6}$ alkylene glycol (straight chain or branched chain alkylene glycol, such as trimethylene glycol, propylene glycol or butanediol, and the like), a (poly)oxyalkylene glycol, bisphenols or alkylene oxide adducts thereof), dicarboxylic acids ($C_{6-12}$ aliphatic dicarboxylic acid, asymmetric aromatic dicarboxylic acid, 1,4-cyclohexane dimethanol, and the like), and the like.

In the copolymer, the ratio (amount of modification) of the copolymeric monomer is 1 to 30 mol %, preferably 3 to 25 mol %, and even more preferably 5 to 20 mol %, approximately.

The polyethylene terephthalate resin is obtained by (co) polymerizing terephthalic acid and ethylene glycol, and then an optional copolymerizable monomer, in a common method, for example, ester-interchanging or direct esterifiying or the like.

The blending amount of the (D) component is 15 to 65 parts by weight relative to 100 parts by weight of the polybutylene terephthalate resin (A), preferably 20 to 55 parts by weight. When the blending amount is more than 65 parts by weight, the hydrolysis properties are deteriorated, and when the blending amount is less than 15 parts by weight, the effect of low warpage becomes insufficient.

In the present invention, it is possible to add a phosphorous stabilizer as the (E) component.

Examples of the phosphorous stabilizer include at least one selected from inorganic phosphorous stabilizers (such as alkaline metal or alkaline earth metal phosphate) and organic phosphorous stabilizers (such as organic phosphite ester, organic phosphate ester, organic phosphonite ester or organic phosphonate ester). The phosphorous stabilizer may also be either in a liquid form or in a solid form. It is known that transesterification takes place between polybutylene terephthalate resin and polycarbonate resin or polyethylene terephthalate resin, and when the cylinder temperature becomes high or the residence time becomes long with the progress of the molding, the transesterification progresses rapidly, which sometimes causes variation in the permeability, causes increase in the viscosity to thereby induce insufficient flowability, promotes the degradation of the resin, or makes it difficult to release a product from the mold. The use of the phosphorous stabilizer can also prevent such a reaction.

Examples of the alkaline metal or alkaline earth metal phosphate include alkaline earth metal salts, such as phosphoric acid or corresponding hydrogenphosphate (for example, potassium phosphate, sodium phosphate (alkaline metal salt, such as monobasic sodium phosphate (sodium dihydrogen phosphate), disodium phosphate (sodium hydrogen phosphate, sodium monohydrogen phosphate, disodium hydrogen phosphate, and the like)); calcium phosphate(monobasic calcium phosphate(calcium dihydrogen phosphate), bis(calcium dihydrogen phosphate) monohydrate, and the like, dibasic calcium phosphate(calcium hydrogen phosphate, calcium hydrogen phosphate dehydrate, and the like)); and magnesium phosphate(magnesium hydrogen phosphate, dihydrogen magnesium phosphate, and the like). Such alkaline metal or alkaline earth metal salt may be either an anhydride or a hydrate.

Examples of the organic phosphite ester include alkyl phosphites (mono- to tri-$C_{6-24}$ alkyl phosphite and the like), such as bis(2-ethylhexyl)phosphite, tridecyl phosphite, triisodecyl phosphate or di-N-octadecyl phosphite; aryl phosphites (mono- to tri-$C_{6-10}$ aryl phosphite and the like) that may have a substituent group (alkyl group, cycloalkyl group, or the like) in the aryl group, such as, diphenyl isodecyl phosphite, triphenyl phosphite, tris(2-cyclohexyl phenyl) phosphite, bis or tris(t-butylphenyl)phosphite, tris(nonylphenyl)phosphite; aralkyl phosphites (mono to tris($C_{6-10}$ aryl-$C_{1-6}$ alkyl)phosphite and the like, such as tribenzyl phosphite, and also bisaryl pentaerythritol diphosphite [bis(2,6-di-t-butyl-4-methylphenyl)pentaerythritol diphosphite and the like], bisaralkyl pentaerythritol diphosphite, and the like.

Examples of the organic phosphate ester include mono- to tri-alkyl esters of phosphoric acid (such as mono- or di-C6-24 alkyl esters of, for example, monostearyl acid phosphate, distearyl acid phosphate, and the like), mono- to tri-aryl esters of phosphoric acid (such as mono- or di-C6-10 aryl phosphates of mono- or di-phenyl phosphate and the like), and the like.

Examples of the organic phosphonite ester include biphenylene diphosphonites, such as tetrakis(2,4-di-t-butyl)-4,4'-biphenylene diphosphonite, (2,4-di-t-butylphenyl)-4,4'-biphenylene diphosphonite.

Examples of the organic phosphonate ester include mono- or di-alkyl phosphonates ($C_{6-24}$ alkyl phosphonate and the like), such as distearyl phosphonate; mono- or di-aryl phosphonates ($C_{6-10}$ aryl phosphonate and the like) that may have a substituent group (alkyl group, cycloalkyl group, or the like) in the aryl group, such as diphenyl phosphonate or di(nonylphenyl)phosphonate; mono- or di-aralkyl phosphonates ($C_{6-10}$ aryl-$C_{1-6}$ alkyl phosphonate and the like), such as dibenzyl phosphonate; and the like.

In a case of using the phosphorous stabilizer (E), the ratio may be, for example, 0.02 to 0.5 parts by weight relative to 100 parts by weight of the polybutylene terephthalate resin (A), preferably 0.02 to 0.2 parts by weight, (for example, 0.05 to 0.1 parts by weight), and even more preferably 0.02 to 0.1 parts by weight (for example, 0.05 to 0.08 parts by weight), approximately. For example, when the addition amount is as much as more than 0.5 parts by weight, there is a possibility of reducing hydrolysis resistance and resistance to heat shock.

In the present invention, as long as not inhibiting the effects of the present invention, it is possible to further blend the elastomer (F) therein. The elastomer (F) is desirably a thermoplastic elastomer or a core shell elastomer. The thermoplastic elastomer includes grafted olefin-based, styrene-based, and polyester-based elastomers.

The addition amount of the (F) elastomer is within the range of 5 to 15 parts by weight relative to 100 parts by weight of the (A) polybutylene terephthalate resin, and preferably 5 to 10 parts by weight. If the addition amount of the (F) elastomer is less than 5 parts by weight, the effect of improving the resistance to heat shock cannot be attained. If the addition amount thereof exceeds 15 parts by weight, the strength decreases.

A preferable grafted olefin-based elastomer is a copolymer composed mainly of ethylene and/or propylene, and there is preferably applicable a graft-copolymer chemically bonded by branching or cross-linking one, two or more of: (a-1) a copolymer of ethylene-unsaturated carboxylic acid alkyl ester or (a-2) an olefin-based copolymer composed of α-olefin and glycidyl ester of α,β-unsaturated acid; and (b) a polymer or copolymer constituted mainly by repeated units represented by the general formula (1).

(where, R is hydrogen or a lower alkyl group, and X is one, two or more group selected from —COOCH$_3$, —COOC$_2$H$_5$, —COOC$_4$H$_9$—COOCH$_2$CH(C$_2$H$_5$)C$_4$H$_9$, —C$_6$H$_5$, and —CN.)

Such graft-copolymer specifically produces the improvement effect of resistance to heat shock.

Examples of the (a-1) ethylene-unsaturated carboxylic acid alkyl ester copolymer include random copolymers such as ethylene-acrylic acid copolymer, ethylene-methacrylic acid copolymer, ethylene-acrylic acid-ethyl acrylate copolymer, ethylene-ethyl acrylate copolymer, ethylene-vinyl acrylate copolymer, or ethylene-vinyl acetate-ethyl acrylate copolymer. These copolymers can be mixed for use. Furthermore, the α-olefin as one of the monomers structuring the olefin-based copolymer of (a-2) includes ethylene, propylene, and butene-1, and ethylene is preferably used. Moreover, the glycidyl ester of α,β-unsaturated acid as another monomer structuring (a-2) is a compound represented by the following formula (2), including acrylic acid glycidyl ester, methacrylic acid glycidyl ester, and ethacrylic acid glycidyl ester. Specifically, methacrylic acid glycidyl ester is preferably used.

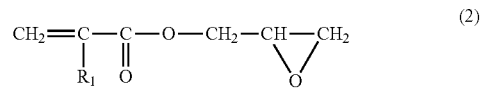

(where, R$_1$ is hydrogen atom or lower alkyl group.)

The olefin-based copolymer composed of α-olefin (such as ethylene) and glycidyl ester of α,β-unsaturated acid can be obtained by copolymerization through a known radical polymerization reaction. The ratio of the α-olefin to the glycidyl ester of α,β-unsaturated acid is preferably 70 to 99% by weight of the α-olefin to 1 relative to 30% by weight of the glycidyl ester of α,β-unsaturated acid.

The polymer or copolymer (b) which is graft-polymerized with the olefin-based copolymer (a-1) or (a-2) is a copolymer composed of a single polymer or two or more polymers constituted by a repeated single unit represented by the formula (1), such as polymethylmethacrylate, polyethylacrylate, polybutylacrylate, poly(2-ethylhexylacrylate), polystyrene, polyacrylonitrile, acrylonitrile-styrene copolymer, butylacrylate-methylmethacrylate copolymer, and butylacrylate-styrene copolymer. Specifically preferred one is butylacrylate-methylmethacrylate copolymer. Also these polymers and copolymers (b) are prepared by radical polymerization of corresponding vinyl-based monomers.

The graft copolymer preferably used in the present invention is not a single use of the olefin-based copolymer of (a-1) or (a-2) or of the (co)polymer of (b), but has the features as a graft copolymer having a branched or cross-linked structure in which the copolymer of (a-1) or (a-2) and the (co)polymer of (b) are chemically bonded at least at one position of the molecular structure. With such a graft structure, there can be attained a significant effect which cannot be obtained by a sole composition of (a-1), (a-2), or (b). The ratio of (a-1) or (a-2) to (b) to constitute the graft copolymer is within the range of 95:5 to 5:95 (weight ratio), preferably 80:20 to 20:80.

The styrene-based elastomer includes a block or graft copolymer (or hydrogenated compound thereof) composed of: the hard segment constituted by a polymer or copolymer of aromatic vinyl monomer such as styrene, $\alpha$-methylstyrene, or vinyltoluene; and the soft segment constituted by a polymer or copolymer of at least one monomer selected from $\alpha$-olefin (including $\alpha$-$C_2$-$C_{12}$ olefin such as ethylene, propylene, 1-butene, 1-hexene, or 1-octene), and diene-based monomer (such as butadiene or isoprene).

The styrene-based elastomer may be an acid-modified elastomer obtained by being modified with acid or acid anhydride such as (meth)acrylic acid or maleic anhydride, a copolymerizable monomer having glycidyl group or epoxy group, (such as glycidyl(meth)acrylate), and an elastomer having reactive functional group, such as epoxy-modified elastomer obtained by epoxidizing the unsaturated bond of the elastomer.

Examples of typical styrene-based elastomers can include: a styrene-diene-styrene block copolymer (styrene-butadiene-styrene block copolymer (SBBS), and styrene-isoprene-styrene block copolymer (SIS)); a hydrogenated block copolymer (styrene-ethylene butylene-styrene block copolymer (or hydrogenated (styrene-butadiene-styrene block copolymer)) (SEBS), styrene-ethylene propylene-styrene block copolymer (or hydrogenated (styrene-isoprene-styrene block copolymer)) (SEPS), styrene-ethylene ethylene propylene-styrene block copolymer (SEEPS), and hydrogenated polymer of random styrene-butadiene copolymer); and a modified copolymer prepared by introducing a functional group (such as epoxy group, carboxyl groups or acid anhydride group) to these copolymers (epoxylated styrene-diene copolymer in which the unsaturated bond of diene is epoxylated, (such as epoxylated styrene-diene-styrene block copolymer or a hydrogenated polymer thereof)).

Next, the core-shell elastomer is a polymer having multi-layer structure composed of a core layer (core part) and a shell layer which covers a portion or all of the core layer (surface of the core layer). The core-shell elastomer preferably has the core layer made of a rubber component (soft component), specifically made of an acrylic-based rubber. The glass transition temperature of the rubber component is, for example, less than 0° C. (−10° C. or less, for example), preferably −20° C. or less (about −180° C. to −25° C., for example), and more preferably may be −30° C. or less (about −150° C. to −40° C., for example).

The acrylic-based rubber as the rubber component is a polymer composed mainly of an acrylic monomer (specifically acrylic acid ester such as alkylacrylate (acrylic acid $C_1$-$C_{12}$ alkyl ester such as butyl acrylate, preferably acrylic acid $C_1$-$C_8$ alkyl ester, more preferably acrylic acid $C_2$-$C_6$ alkyl ester)). The acrylic-based rubber may be a polymer or copolymer of acrylic-based monomer, (copolymer of acrylic-based monomers, copolymer of acrylic-based monomer with another monomer containing unsaturated bond, and the like), and may be a copolymer of acrylic-based monomer (and another monomer containing unsaturated bond) with cross-linking monomer.

The shell layer of the core-shell elastomer may be a vinyl-based polymer. The vinyl-based polymer is obtained by polymerization or copolymerization of at least one monomer selected from aromatic vinyl monomer, cyanated vinyl monomer, methacrylic acid ester-based monomer, and acrylic acid ester monomer. The rubber layer and the shell layer of such a core-shell type copolymer are normally bonded together by graft copolymerization. The graft copolymerization is attained, as needed, by adding a graft-crossing agent which reacts with the shell layer at the time of polymerization of the rubber layer, thus providing the rubber layer with the reactive group, followed by forming the shell layer. The graft-crossing agent for silicone-based rubber may be an organosiloxane having a vinyl bond or an organosiloxane having thiol, preferably an acryloxysiloxane, a methacryloxysiloxane or a vinylsiloxane.

The polyester-based elastomer can be grouped into polyether type and polyester type. Any of them can be used if only the flexural modulus is 1000 MPa or less, preferably 700 MPa or less. If the flexural modulus exceeds 1000 MPa, sufficient flexibility cannot be attained. The polyether type polyester-based elastomer is a polyester elastomer composed of an aromatic polyester as the hard segment, and a polyester as the soft segment composed of an oxy-alkylene glycol polymer and a dicarboxylic acid. The aromatic polyester unit in the hard segment is a polycondensate of dicarboxylic acid compound with dihydroxy compound, a polycondensate of oxy-carboxylic acid compound, or a polycondensate of these three components. For example, polybutylene terephthalate and the like are used as the hard segment. The soft segment to be used includes a compound obtained by polycondensation of polyalkylene ether with dicarboxylic acid. For example, an esterified compound of polyoxy tetramethylene glycol, derived from tetrahydrofuran is used. The above polyether elastomer is commercially available as: PELPRENE P-30B, P-70B, P-90B, and P-280B, manufactured by Toyobo Co., Ltd.; Hytrel 4057, 4767, 6347, and 7247, manufactured by Du Pont-Toray Co., Ltd.; Riteflex 655 manufactured by Ticona LLC; or the like.

The polyester type elastomer is a polyester elastomer composed of an aromatic polyester as the hard segment and an amorphous polyester as the soft segment. The aromatic polyester unit in the hard segment is the same to that of the above polyether type elastomer. The soft segment is a ring-opening polymer of lactone, that is to say, a polylactone, or an aliphatic polyester derived from aliphatic dicarboxylic acid and aliphatic diol. The polyester type elastomer is commercially available as PERPREN S-1002 and S-2002, manufactured by Toyobo Co., Ltd., or the like.

In order to further impart a desired characteristic depending on a purpose in use, the composition of the present invention may contain known substances which are commonly added to thermoplastic resins and thermosetting resins, such as stabilizer including antioxidant, heat-stabilizer, or UV absorber, antistatic agent, coloring agent such as dye or pigment, lubricant, plasticizer, crystallization accelerator, crystal nucleating agent, and epoxy compound within the range not deteriorating the effect of the present invention.

In particular, although antistatic agent, coloring agent, lubricant, and plasticizer often contain carboxyl groups, hydroxyl group, and amino group, these functional groups are preferably not contained because they likely react with carbodiimide group.

In the present invention, in order to improve the moldability, a mold releasing agent can be added. Any type of mold releasing agent can be preferably applied, including olefin-based polymer, aliphatic amide compound, and aliphatic ester compound. Specifically preferred mold releasing agent is an olefin-based polymer presumed to have low reactivity with carbodiimide compound, or an aliphatic ester compound having 100 or less of hydroxyl group value determined by the Japan Oil Chemists' Society Method 2,4,9,2-71 (Pyridine-acetic anhydride method).

Additive containing carboxyl groups, hydroxyl group, or amino group is preferably not used.

The resin composition to be used in the present invention can be easily prepared by facilities and method commonly used as the conventional resin composition preparation method. Examples are: (1) the method in which the respective components are mixed together, and the mixture is kneaded in and extruded from a single screw or twin screw extruder to form pellets, followed by molding; (2) the method in which pellets having different compositions from each other are prepared, and specified amounts of the respective pellets are mixed together to be subjected to molding, and then the molded article having a desired composition is obtained; and (3) the method in which one or more components are directly supplied to the molding machine. Any of above-given methods can be applied. The method in which a portion of a resin component is prepared in fine powder form, which is then mixed with other components, is a preferred one to attain homogeneous blending of the components.

In preparing pellets kneaded by using an extruder, the temperature of cylinder of the extruder is preferably set so that the temperature of resin in the extruder is within the range of 240° C. to 300° C., and more preferably 250° C. to 270° C. If the temperature thereof is below 240° C., the reaction between polybutylene terephthalate and carbodiimide becomes insufficient, and thus, resistance to hydrolysis and resistance to heat-shock may be insufficient, or excessively high viscosity of molten material may result in breaking fibrous filler, which may finally lead to failing to attain necessary mechanical properties. When the temperature of the resin exceeds 300° C., the resin decomposition likely occurs, and the resistance to hydrolysis and the resistance to heat shock may become insufficient.

In the same way as in molding, it is preferable to set the temperature of cylinder of the extruder so that the resin temperature in the molding machine is within the range of 240° C. to 300° C., and more preferably 250° C. to 270° C. Outside that temperature range, insufficient properties may result in the same way as in the above case. The mold temperature at the time of injection molding is preferably within the range of 40° C. to 100° C., more preferably 60° C. to 90° C. If the mold temperature is below 40° C., the post-shrinkage occurs and strain is generated to thereby fail in attaining a desired shape or to fail in attaining sufficient resistance to heat shock. If the mold temperature exceeds 100° C., the molding cycle takes a long time, which deteriorates the mass-production performance.

Furthermore, the (B) carbodiimide compound can be blended as the master batch made up of a resin as the matrix, and the use of master batch is often easy in terms of practical handling. A master batch of polybutylene terephthalate resin is preferably used. However, a master batch prepared by other resins may also be applicable. In the case of master batch of polybutylene terephthalate resin, the amount of the master batch may be adjusted so as to assure the range of specified blending amount of the (B) carbodiimide compound. The master batch may be preliminarily added at the time of melting and kneading to form homogeneous pellets. Alternatively, components other than the carbodiimide compound are preliminarily formed as homogeneous pellets by melt-kneading and the like, and the pellet-blend, in which the master batch pellets of the carbodiimide compound are dry-blended at the time of molding, may be used for molding.

The resin composition of the present invention can be set as 350 Pa·s or less of the melt viscosity at a temperature of 260° C. and a shear rate of 1000 $sec^{-1}$ in accordance with ISO 11443. Furthermore, the melt viscosity can also be set as 300 Pa·s or less. Unless the melt viscosity secures 350 Pa·s or less, the flowability becomes insufficient, and the resin may not be filled in the mold in some cases.

The resin composition of the present invention can achieve the tensile strength of 120 MPa or more, specifically 130 MPa or more in accordance with ISO 527.

The polybutylene terephthalate resin composition of the present invention is particularly useful for various insert-injection molded articles.

EXAMPLES

The present invention is described below in more detail referring to the following Examples. However, the present invention is not limited to these examples.

Examples 1 to 9

Comparative Examples 1 to 5

The respective components shown in Table 1 were weighed and were dry-blended together. The blend was then melt-kneaded in a 30 mm dia. twin screw extruder (TEX-30, manufactured by The Japan Steel Works, Ltd.) at a cylinder temperature of 260° C., an extrusion rate of 15 kg/h, and a screw rotational speed of 150 rpm, to form pellets. By using the pellets prepared, respective test pieces were formed to measure various physical properties. The results are shown in Table 1 together.

The detail of the components used and the measurement method for evaluating the physical properties are shown below.

(A) Polybutylene terephthalate resin
 (A-1) Manufactured by WinTech Polymer Ltd.; intrinsic viscosity of 0.69, and amount of terminal carboxyl groups of 24 meq/kg
 (A-2) Manufactured by WinTech Polymer Ltd.; intrinsic viscosity of 0.70, and amount of terminal carboxyl groups of 44 meq/kg
(B) Carbodiimide compound
 (B-1) Aromatic carbodiimide compound: Stabaxol P, manufactured by Rhein Chemie Japan Ltd.
 (B-2) Aromatic carbodiimide compound: Stabaxol P400, manufactured by Rhein Chemie Japan Ltd.

(C) Glass fiber
(C-1) ECS03-T127 manufactured by Nippon Electric Glass Co., Ltd.
(D) Thermoplastic resin
(D-1) L-1225 (polycarbonate resin), Teijin Chemicals Ltd.
(D-2) FK-DCX (polyethylene terephthalate resin) manufactured by Teijin Fibers Ltd.
(E) Phosphorous stabilizer
(E-1) Monocalcium phosphate
(E-2) ADK STAB PEP-36 manufactured by Asahi Denka Co., Ltd.
(F) Elastomer
(F-1) Septon 4055 (polystyrene-poly(ethylene-ethylene/propylene) block polystyrene copolymer) produced by Kuraray Co., Ltd.
(G) Mold releasing agent
(G-1) Loxiol VPG 861 manufactured by Cognis Japan Ltd., hydroxyl value of 20 or less (pentaerythritol stearate)
(G-2) Sanwax 165 P manufactured by Sanwa Kasei Kogyo Co., Ltd. (low molecular weight polyethylene)
(G-3) RIKEMAL B-150 manufactured by Riken Vitamin Co., Ltd. hydroxyl value of 80 (sorbitan fatty acid ester)

[Melt Viscosity Characteristic]

The melt viscosity was measured in accordance with ISO 11443 under the condition of a cylinder temperature of 260° C. and a shear rate of 1000 sec$^{-1}$.

[Resistance to Heat Shock]

Pellets to be used were molded into an insert-molded article by insert-injection molding under the condition of a resin temperature of 260° C., a mold temperature of 65° C., an injection time of 25 sec, and a cooling time of 10 sec by using a mold for forming test piece (a mold inserting an iron core of 18 mm in length, 18 mm in width, and 30 mm in height into a rectangular cylinder of 22 mm in length, 22 mm in width, and 51 mm in height) so that the minimum thickness of a portion of resin section becomes 1 mm. The insert molded article obtained was subjected to heat shock resistance testing in which one cycle includes heating at 140° C. for one hour and 30 minutes by using a cold impact tester, and then lowering the temperature to −40° C. to cool for one hour and 30 minutes, and then further raising the temperature to 140° C., and the number of cycles until the molded article generated cracks was measured to evaluate the resistance to heat shock.

[Pressure Cooker Test]

Pellets to be used were injection-molded to prepare ISO 3167 tensile test piece under the condition of a resin temperature of 260° C., a mold temperature of 80° C., an injection time of 15 sec, and a cooling time of 15 sec, and the tensile strength was measured in accordance with ISO 527. After that, by using the pressure cooker tester, the tensile test piece was exposed to an environment of 121° C. and 100% RH for 50 hours and 100 hours. From the tensile strength before and after the exposure, the tensile strength retention rate was calculated.

[Warpage]

A flat plate was injection-molded by using pellets at a resin temperature of 260° C., at a mold temperature of 65° C., for an injection time period of 25 seconds, and a cooling time period of 10 seconds with a plate molding mold (80×80×1.5 mmt, gate width of 2 mm) and the flatness after 24 hours was measured.

[Table 1]

| | | Examples | | | | | | | | |
|---|---|---|---|---|---|---|---|---|---|---|
| | | 1 | 2 | 3 | 4 | 5 | 6 | 7 | 8 | 9 |
| (A) | A-1 (parts by weight) | 100 | 100 | 100 | 100 | 100 | 100 | 100 | 100 | 100 |
| | A-2 (parts by weight) | | | | | | | | | |
| (B) | B-1 (parts by weight) | 0.9 | 1.0 | 1.2 | 1.0 | | | | | |
| | B-2 (parts by weight) | | | | | 0.9 | 0.9 | 0.9 | 0.9 | 0.9 |
| (C) | C-1 (parts by weight) | 53 | 62 | 70 | 61 | 53 | 53 | 53 | 53 | 53 |
| (D) | D-1 (parts by weight) | 23 | | 39 | 43 | 23 | 23 | 23 | 23 | 23 |
| | D-2 (parts by weight) | | 42 | | | | | | | |
| (E) | E-1 (parts by weight) | 0.05 | 0.06 | 0.07 | 0.06 | 0.05 | | | | |
| | E-2 (parts by weight) | | | | | | 0.2 | 0.2 | 0.2 | |
| (F) | F-1 (parts by weight) | | | 23 | | | | | | |
| (G) | G-1 (parts by weight) | | | | | | | 0.3 | | |
| | G-2 (parts by weight) | | | | | | | | 0.3 | |
| | G-3 (parts by weight) | | | | | | | | | 0.3 |
| | Carbodiimide equivalent/Amount of carboxyl group | 1.2 | 1.3 | 1.5 | 1.3 | 1.2 | 1.2 | 1.2 | 1.2 | 1.2 |
| Evaluation | Melt viscosity (Pa·s) | 280 | 270 | 330 | 300 | 300 | 280 | 280 | 270 | 280 |
| | Warpage | 4.6 | 5.0 | 1.8 | 2.3 | 4.6 | 4.3 | 4.5 | 4.6 | 4.3 |
| | Resistance to heat-shock | 300< | 300< | 300< | 200< | 300< | 300< | 300< | 300< | 150< |
| | Tensile strength (MPa) | 150 | 150 | 108 | 145 | 150 | 148 | 145 | 143 | 146 |
| | Tensile strength retention rate after 50 hr (%) | 83 | 68 | 92 | 80 | 85 | 90 | 88 | 87 | 80 |
| | Tensile strength retention rate after 100 hr (%) | 66 | 29 | 79 | 54 | 64 | 71 | 60 | 65 | 43 |

| | | Comparative Examples | | | | |
|---|---|---|---|---|---|---|
| | | 1 | 2 | 3 | 4 | 5 |
| (A) | A-1 (parts by weight) | | 100 | 100 | 100 | 100 |
| | A-2 (parts by weight) | 100 | | | | |
| (B) | B-1 (parts by weight) | 1.8 | | | | |
| | B-2 (parts by weight) | | | | | |
| (C) | C-1 (parts by weight) | 53 | 43 | 52 | 70 | 62 |
| (D) | D-1 (parts by weight) | 23 | | 21 | 39 | |

-continued

|   |   |   |   |   |   |   |
|---|---|---|---|---|---|---|
|  | D-2 (parts by weight) |  |  |  |  | 42 |
| (E) | E-1 (parts by weight) | 0.05 | 0.05 | 0.05 | 0.07 | 0.06 |
|  | E-2 (parts by weight) |  |  |  |  |  |
| (F) | F-1 (parts by weight) |  |  |  | 23 |  |
| (G) | G-1 (parts by weight) |  |  |  |  |  |
|  | G-2 (parts by weight) |  |  |  |  |  |
|  | G-3 (parts by weight) |  |  |  |  |  |
|  | Carbodiimide equivalent/Amount of carboxyl group | 1.2 | — | — | — | — |
| Evaluation | Melt viscosity (Pa·s) | 320 | 180 | 280 | 300 | 250 |
|  | Warpage | 4.8 | 8.0 | 4.7 | 2.0 | 4.8 |
|  | Resistance to heat-shock | 200 | 60 | 30 | 90 | 40 |
|  | Tensile strength (MPa) | 152 | 160 | 147 | 108 | 148 |
|  | Tensile strength retention rate after 50 hr (%) | 80 | 60 | 40 | 89 | 60 |
|  | Tensile strength retention rate after 100 hr (%) | 40 | 30 | 18 | 43 | 29 |

The invention claimed is:

1. A method of manufacturing an insert injection-molded article wherein the injected portion thereof is a polybutylene terephthalate composition formed by blending a composition in the absence of aromatic polyvalent carboxylic acid esters, the composition comprising:

100 parts by weight of a polybutylene terephthalate resin (A) having 30 meq/kg or less of terminal carboxyl groups;

a carbodiimide compound (B) in an amount of 0.5 to 2 equivalents of the carbodiimide functional group when the amount of terminal carboxyl groups in the polybutylene terephthalate resin (A) is set as 1, wherein the carbodiimide is selected from the group consisting of di-2,6-dimethylphenyl carbodiimide, poly(4,4'-diphenylmethane carbodiimide), poly(phenylene carbodiimide), and poly(triisopropylphenylene carbodiimide);

20 to 100 parts by weight of a fibrous filler (C);

15 to 65 parts by weight of polycarbonate resin (D);

0.02 to 0.5 part by weight of a phosphorous stabilizer (E) relative to 100 parts by weight of polybutylene terephthalate resin (A); and wherein said composition displays good flowability as evidenced by a melt viscosity of 350 Pa·s or less at a temperature of 260° C. and a shear rate of 1000 sec$^{-1}$ in accordance with ISO 11443; and wherein said composition displays a tensile strength retention rate of 80% to 92% or larger under an environment of 121° C. and 100% relative humidity for 50 hours and a tensile strength retention rate of 54% to 71% under the same environment for 100 hours both in accordance with ISO 527; and injecting said polybutylene terephthalate composition while molten into a mold including a metal insert to form an insert injection-molded article exhibiting improved resistance to heat shock and wherein prior to the blending of said composition selecting said polybutylene terephthalate resin (A), and selecting carbodiimide compound (B), and providing (A) and (B) in said composition in concentrations so that 0.5 to 2 equivalents of carbodiimide functional groups are present per each carboxyl functional group of (A) and wherein (A), (B), (C), (D), and (E) are provided in said composition within the specified ranges so as to facilitate the expression of said improved resistance to heat shock of said insert injection-molded article when subjected to 200 cycles of heating at 140° C. for 1.5 hr. and cooling at −40° C. for 1.5 hr.

2. A method of manufacturing an insert injection-molded article wherein the injected portion thereof is a polybutylene terephthalate composition formed by blending a composition in the absence of aromatic polyvalent carboxylic acid esters, the composition comprising:

100 parts by weight of a polybutylene terephthalate resin (A) having 30 meq/kg or less of terminal carboxyl groups;

a carbodiimide compound (B) having a molecular weight of 2000 or more in an amount of 0.5 to 2 equivalents of the carbodiimide functional group when the amount of terminal carboxyl groups in the polybutylene terephthalate resin (A) is set as 1, wherein the carbodiimide is selected from the group consisting of di-2,6-dimethylphenyl carbodiimide, poly(4,4'-diphenylmethane carbodiimide), poly(phenylene carbodiimide), and poly(triisopropylphenylene carbodiimide);

20 to 100 parts by weight of a fibrous filler (C);

15 to 65 parts by weight of polycarbonate resin (D);

0.02 to 0.5 part by weight of a phosphorous stabilizer (E) relative to 100 parts by weight of polybutylene terephthalate resin (A), and wherein said composition displays good flowability as evidenced by a melt viscosity of 350 Pa·s or less at a temperature of 260° C. and a shear rate of 1000 sec$^{-1}$ in accordance with ISO 11443; and wherein said composition displays a tensile strength retention rate of 80% to 92% under an environment of 121° C. and 100% relative humidity for 50 hours and a tensile strength retention rate of 54% to 71% under the same environment for 100 hours both in accordance with ISO 527; and injecting said polybutylene terephthalate composition while molten into a mold including a metal insert to form an insert injection-molded article exhibiting improved resistance to heat shock and wherein prior to the blending of said composition selecting said polybutylene terephthalate resin (A), and selecting carbodiimide compound (B), and providing (A) and (B) in said composition in concentrations so that 0.5 to 2 equivalents of carbodiimide functional groups are present per each carboxyl functional group of (A) and wherein (A), (B), (C), (D), and (E) are provided in said composition within the specified ranges so as to facilitate the expression of said improved resistance to heat shock of said insert injection-molded article when subjected to 200 cycles of heating at 140° C. for 1.5 hr. and cooling to −40° C. for 1.5 hr.

3. The method of manufacturing an insert injection-molded article having improved resistance to heat shock according to claim 2, wherein said carbodiimide compound (B) is present in said polybutylene terephthalate resin composition in a concentration of 0.8 to 1.5 parts by weight per 100 parts by weight of said polybutylene terephthalate resin (A).

4. The method of manufacturing an insert injection-molded article having improved resistance to heat shock according to claim 1, wherein said carbodiimide compound (B) is present in said polybutylene terephthalate resin composition in a concentration of 0.8 to 1.5 parts by weight per 100 parts by weight of said polybutylene terephthalate resin (A).

5. The method of manufacturing an insert injection-molded article having improved resistance to heat shock according to claim 1, wherein the intrinsic viscosity of the polybutylene terephthalate resin (A) of the polybutylene terephthalate resin composition is within the range of 0.67 to 0.90 dL/g.

6. The method of manufacturing an insert injection-molded article having improved resistance to heat shock according to claim 2, wherein the intrinsic viscosity of the polybutylene terephthalate resin (A) of the polybutylene terephthalate resin composition is within the range of 0.67 to 0.90 dL/g.

7. The method of manufacturing an insert injection-molded article having improved resistance to heat shock according to claim 1, wherein the tensile strength of the resulting article in accordance with ISO 527 is 120 MPa or more.

8. The method of manufacturing an insert injection-molded article having improved resistance to heat shock according to claim 2, wherein the tensile strength of the resulting article in accordance with ISO 527 is 120 MPa or more.

9. The method of manufacturing an insert injection-molded article having improved resistance to heat shock according to claim 1, wherein the polybutylene terephthalate composition further comprises 5 to 15 parts by weight of a thermoplastic elastomer (F) relative to 100 parts by weight of the polybutylene terephthalate resin (A).

10. The method of manufacturing an insert injection-molded article having improved resistance to heat shock according to claim 9, wherein said thermoplastic elastomer (F) is a grafted olefin-based elastomer.

11. The method of manufacturing an insert injection-molded article having improved resistance to heat shock according to claim 2, wherein the polybutylene terephthalate composition further comprises 5 to 15 parts by weight of a thermoplastic elastomer (F) relative to 100 parts by weight of the polybutylene terephthalate resin (A).

12. The method of manufacturing an insert injection-molded article having improved resistance to heat shock according to claim 11, wherein said thermoplastic elastomer (F) is a grafted olefin-based elastomer.

13. The method of manufacturing an insert injection-molded article having improved resistance to heat shock according to claim 11, wherein said thermoplastic elastomer (F) is at least one selected from the group consisting of grafted olefin-based elastomer, styrene-based elastomer, and polyester-based elastomer.

14. The method of manufacturing an insert injection-molded article having improved resistance to heat shock according to claim 1, wherein said phosphorous stabilizer is present in said composition in a concentration of 0.05 to 0.1 part by weight relative to 100 parts by weight of polybutylene terephthalate resin (A).

15. The method of manufacturing an insert injection-molded article having improved resistance to heat shock according to claim 2, wherein said phosphorous stabilizer is present in said composition in a concentration of 0.05 to 0.1 part by weight relative to 100 parts by weight of polybutylene terephthalate resin (A).

\* \* \* \* \*